United States Patent [19]
Cooke

[11] Patent Number: 6,033,754
[45] Date of Patent: Mar. 7, 2000

[54] REINFORCED LAMINATED VENEER LUMBER

[75] Inventor: Leslie Cooke, Eugene, Oreg.

[73] Assignee: Fiber Technologies, Inc., Drain, Oreg.

[21] Appl. No.: 09/270,630

[22] Filed: Mar. 17, 1999

Related U.S. Application Data

[63] Continuation-in-part of application No. 08/700,144, Aug. 20, 1996, Pat. No. 5,725,929.

[51] Int. Cl.[7] ...................................................... B32B 21/13
[52] U.S. Cl. ........................... 428/106; 428/114; 428/119; 442/1
[58] Field of Search ................................. 428/106; 442/1

[56] References Cited

U.S. PATENT DOCUMENTS

| | | | |
|---|---|---|---|
| 4,743,484 | 5/1988 | Robbins | 428/106 |
| 5,641,553 | 6/1997 | Tingley | 572/103 |
| 5,721,036 | 2/1998 | Tingley | 428/96 |
| 5,725,929 | 3/1998 | Cooke et al. | 428/106 |
| 5,747,151 | 5/1998 | Tingley | 428/299.1 |

FOREIGN PATENT DOCUMENTS

| | | | |
|---|---|---|---|
| 2588507 | 4/1987 | France | B32B 21/13 |

*Primary Examiner*—Terrel Morris
*Assistant Examiner*—Ula Ruddock
*Attorney, Agent, or Firm*—Fasth Law Offices; Rolf Fasth

[57] ABSTRACT

The reinforced laminated veneer lumber of the present invention includes an engineered fabric that is disposed between the veneer sheets to provide added reinforcement and enables the use of lower grade veneer sheets for structural applications.

5 Claims, 2 Drawing Sheets

REINFORCED LAMINATED VENEER LUMBER

PRIOR APPLICATION

This is a continuation in part application of U.S. patent application Ser. No. 08/700,144, filed Aug, 20, 1996 now U.S. Pat. No. 5,725,929.

TECHNICAL FIELD

The invention relates to a laminated veneer lumber panel that is structurally reinforced with an engineered fabric.

BACKGROUND AND SUMMARY OF THE INVENTION

Laminated veneer lumber (LVL) is a densified wood product composed of multiple strips or sheets of wood veneer that are laminated together using heat, pressure and exterior quality adhesive, to form thick panels. The woodgrain in the sheets of veneer is normally in the same longitudinal direction in order to maximize the available strength and stiffness of the resultant LVL material. This alignment of the wood fiber, together with the dispersion of wood defects such as knots, enables LVL products to be used at higher structural design loadings than conventional solid wood.

LVL is widely used in the form of structural beams, headers, columns and posts in both residential and commercial applications. LVL is also used in miscellaneous applications such as truck beds and concrete forms.

LVL is made from veneers obtained from logs of broadleaved trees such as lauans and beech wood, or of acicular trees such as North American woods, Japanese cypress and cedar by chopping the log into cross segments of a given length and cutting the segments into veneer sheets of 2–3 mm thickness using a rotary lathe. The veneer sheets are then dried, laminated by arranging them in parallel in the grain direction and bonded with an adhesive.

The structural properties of the resultant LVL is predominantly determined by the quality of the wood veneer sheets that are used. The quality of the wood veneer sheets can vary considerably depending upon the source of the original lumber. High grade timber is becoming increasingly scarce and in general, wood quality is declining as more juvenile and second growth wood is being harvested for veneer production. Therefore, it is becoming more important to be able to enhance the structural properties of LVL panels that are made from lower grade veneer sheets.

Under certain loading conditions, LVL panels may have insufficient structural properties in the direction that is perpendicular to the grain direction. For example, conventional LVL panels sometimes exhibit a cupping problem where the whole panel becomes slightly curved. Such problems may become worse if lower grade veneers are used in the manufacture of the LVL. It is also commercially attractive for a manufacturer if it can use lower quality, less expensive veneers and yet still achieve an acceptable level of structural performance from the LVL material so produced.

The engineered fabric reinforced LVL panel of the present invention provides superior structural properties compared to unreinforced conventional LVL. The LVL panel of the present invention has at least one sheet of an engineered fabric that is disposed between conventional veneer sheets to reinforce the LVL panel.

The reinforced LVL panel of the present invention provides excellent load bearing characteristics even when lower quality veneer sheets are used partly due to the novel employment of reinforcements.

DETAILED DESCRIPTION

Figure 1:
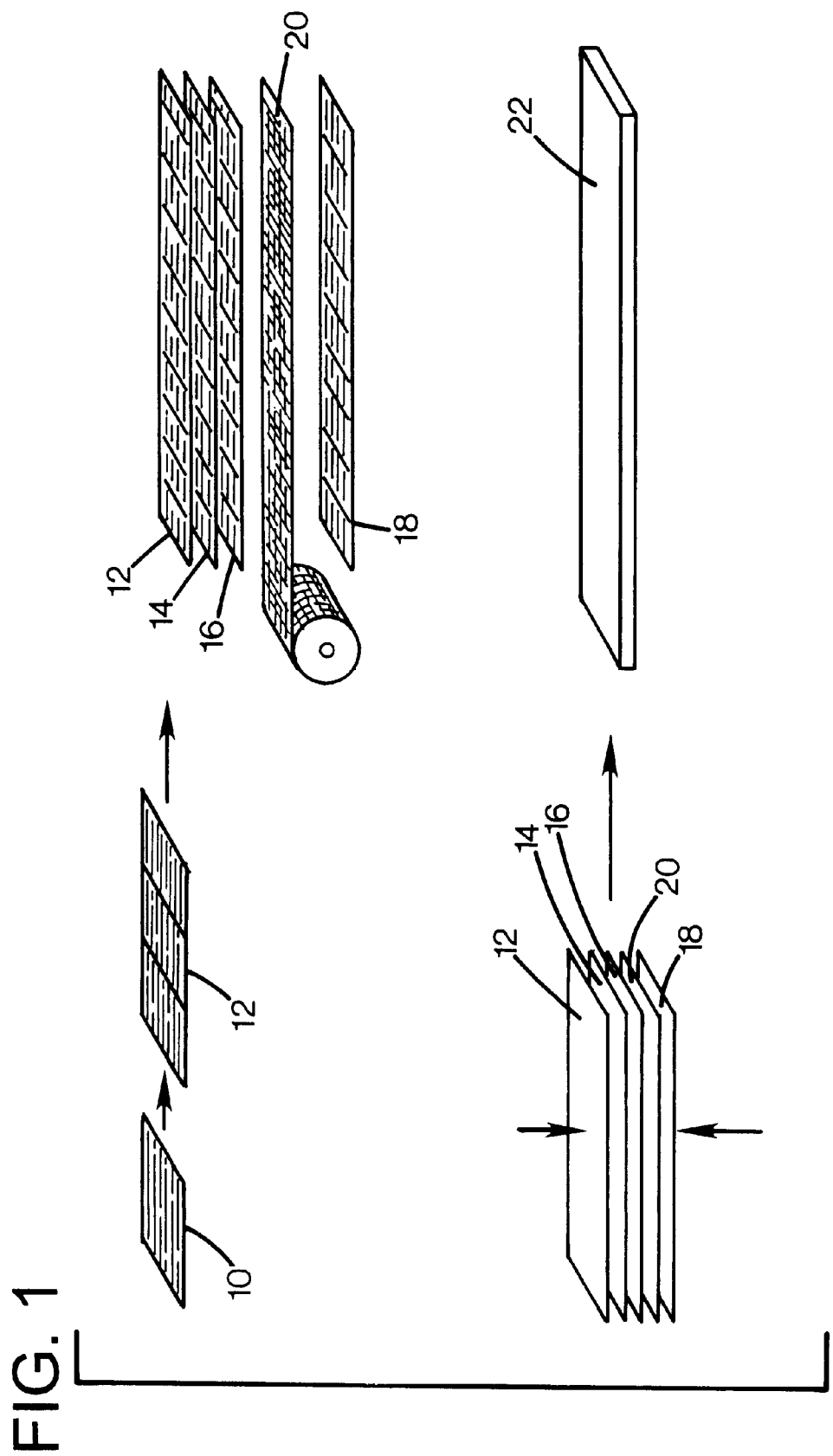
FIG. 1 is a schematic illustration of a manufacturing process of a reinforced LVL panel according to the present invention.
Figure 2:
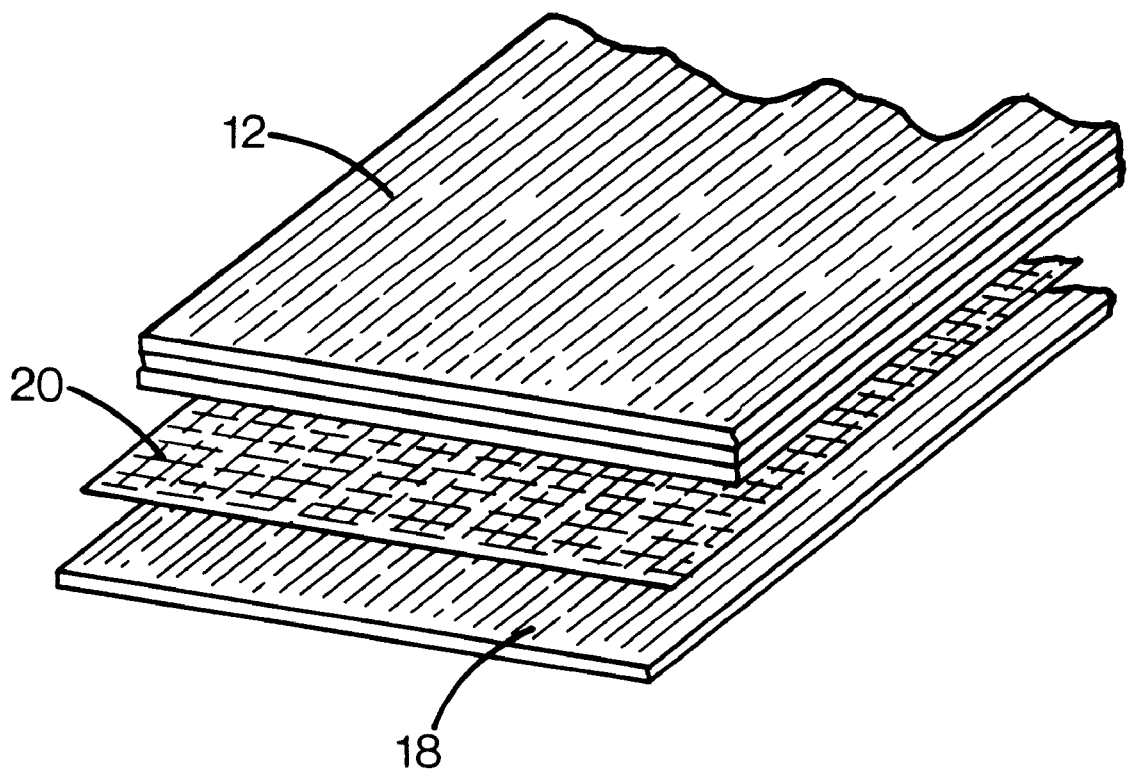
FIG. 2 is a perspective view of a reinforced LVL panel of the present invention.

FIG. 1 illustrates a portion of a manufacturing process of a reinforced LVL panel according to the present invention. FIG. 2 shows a portion of a reinforced LVL panel that has been manufactured according to the process of the present invention. A veneer sheet 10 may be longitudinally joined to other veneer sheets by gluing or adhering the edges of the veneer sheets together to form a joined veneer sheet 12. The veneer sheets are joined to one another so that the fiber direction of the fibers in the veneer sheets is the same. A water resistant phenolic or melamine type wood glue may be used for longitudinally joining the veneer sheets.

The joined veneer sheet 12 is then stacked on top of other joined veneer sheets such as the joined veneer sheets 14, 16 and 18. Conventional wood glue, such as phenolic or melamine glue, may be used to laminate the veneer sheets. The joined veneer sheets are preferably stacked on top of one another so that the fiber direction of the veneer sheets is the same. The veneer sheets are carefully stacked so that the joints are evenly distributed. In other words, a joint of one of the veneer sheets should not be adjacent to a joint of the veneer sheet that is either below or above. The joints are often weak and it is undesirable to have two joints be adjacent one another.

An important feature of the present invention is that a reinforcement material such as a fiber reinforced polymeric matrix material 20 is placed between the joined veneer sheets to provide reinforcement. Of course, a plurality of reinforcement materials may be used between the veneer sheets depending upon the intended application of the finish veneer panel. The reinforcement material may include such high performance fibers as aramid, carbon, glass or high performance polyethylene. Other high performance fibers may also be used. The electrical, thermal and structural properties of the LVL panel may be custom designed to the particular application depending upon the type of fiber reinforcement that is being used. The high performance fibers are preferably disposed in a suitable resin matrix. In the preferred embodiment, the resin matrix is specially formulated to be compatible with the wood glue used to laminate the veneer sheets together and to fully cure at the temperature and pressure of the LVL manufacturing process.

The reinforcement material 20 may be an engineered fabric such as a mesh fabric that is placed between the veneer sheets 16 and 18. For example, a roll of a mesh fabric could be used similar to (but not restricted to) some materials currently available from Clark Schwebel Tech-Fab. The mesh fabric 20 may have a predominant fiber direction that is parallel or perpendicular to the fiber direction of the veneer sheets. To enhance the strength of the LVL in a direction perpendicular to the wood grain direction, the predominant fiber direction of the mesh fabric is aligned perpendicular to the wood fiber direction of the veneer sheets. It is to be understood, that the mesh fabric may be placed at other angles such as 45 degrees or any other angle relative to the fiber direction of the veneer panels in order to achieve specific properties of the reinforced LVL. A fabric having randomly oriented fibers may also be used.

In a cutting step, the length of the mesh fabric 20 is adjusted to the length of the veneer sheets. The stacked veneer sheets and the mesh fabric 20 are then pressurized and heated to form a finished LVL panel 22. In most applications, it is necessary to debulk the LVL panel assembly of glued veneers and mesh fabric(s) prior to hot pressing it to remove any entrapped air from between the veneers, fabric sheet(s) and adhesive. This degassing process generally requires pressures in the range of 50–80 psi. The veneer sheets and the fabric(s) are then heated to about 250–350° F. and pressurized at about 150–200 psi. to ensure that the sheets are properly bonded to one another and to ensure that the resin matrix of the mesh fabric is cured. This latter resin matrix is engineered to cure at about the same temperature as the adhesive between the veneer sheets. The resin matrix is also engineered to be compatible with the adhesive.

While the present invention has been described in accordance with preferred embodiments, it is to be understood that certain substitutions and alterations may be made thereto without departing from the spirit and scope of the following claims.

I claim:

1. A laminated veneer lumber panel comprising:

a first veneer sheet;

an engineered fabric attached to the first veneer sheet; and a second veneer sheet attached to the engineered fabric; and the engineered fabric being a mesh fabric that is reinforced with glass fibers.

2. The laminated veneer lumber panel according to claim 1 wherein the mesh fabric is reinforced with carbon fibers.

3. The laminated veneer lumber panel according to claim 1 wherein the mesh fabric is reinforced with an aramid fiber.

4. The laminated veneer lumber panel according to claim 1 wherein the first and second veneer sheets have a first fiber direction and the engineered fabric has a second fiber direction that is perpendicular to the first fiber direction.

5. The laminated veneer lumber panel according to claim 1 wherein the first and second veneer sheets have a first fiber direction and the engineered fabric has a second fiber direction that is substantially parallel to the first fiber direction.

* * * * *